United States Patent
Yang et al.

(10) Patent No.: US 9,036,702 B2
(45) Date of Patent: May 19, 2015

(54) METHOD AND APPARATUS FOR IMAGE ENCODING USING HOLD-MBS, AND METHOD AND APPARATUS FOR IMAGE DECODING USING HOLD-MBS

(75) Inventors: Jiheng Yang, Beijing (CN); Hui Zhang, Beijing (CN); Yumeng Li, Beijing (CN)

(73) Assignee: THOMSON LICENSING, Issy-les-Moulineaux (FR)

( * ) Notice: Subject to any disclaimer, the term of this patent is extended or adjusted under 35 U.S.C. 154(b) by 478 days.

(21) Appl. No.: 12/807,640

(22) Filed: Sep. 10, 2010

(65) Prior Publication Data

US 2011/0058608 A1    Mar. 10, 2011

(30) Foreign Application Priority Data

Sep. 10, 2009   (EP) .................................... 09305827

(51) Int. Cl.
*H04N 7/50*      (2006.01)
*H04N 19/436*    (2014.01)
(Continued)

(52) U.S. Cl.
CPC ... *H04N 19/00521* (2013.01); *H04N 19/00272* (2013.01); *H04N 19/00012* (2013.01);
(Continued)

(58) Field of Classification Search
CPC .............. H04N 7/50; H04N 19/00884; H04N 19/00521; H04N 19/00781; H04N 19/00951
USPC ............. 375/240.24, 240.12, 240.25, 240.16, 375/E7.125, 240.01
IPC .............................. H04N 7/11, 7/12, 7/26, 7/46
See application file for complete search history.

(56) References Cited

U.S. PATENT DOCUMENTS 4,972,260 A    11/1990   Fujikawa et al.
8,649,615 B2   2/2014    Endo
(Continued)

FOREIGN PATENT DOCUMENTS

| EP | 1956847   | 8/2008 |
|----|-----------|--------|
| EP | 2211552   | 7/2010 |
| JP | 2009027693| 2/2009 |

OTHER PUBLICATIONS

Haskell, B.G. et al., "Image and Video Coding-Emerging Standards and Beyond", IEEE Transactions on Circuits and Systems for Video Technology, vol. 8, No. 7, Nov. 1, 1998, IEEE Service Center, Piscataway, NJ, pp. 814-837.
(Continued)

*Primary Examiner* — Jay Au Patel
*Assistant Examiner* — Neil Mikeska
(74) *Attorney, Agent, or Firm* — Tutunjian & Bitetto, P.C.

(57) ABSTRACT

In video/image coding, macroblocks (MBs) are often intra coded in raster scan order, starting from one seed MB. The invention improves intra prediction for optimized usage of multi-core processors. Encoding starts from multiple intra coded seed MBs per frame, and continues with adjacent MBs. A predefined prediction spread pattern (growth pattern) is used that comprises simultaneous prediction of two or more adjacent MBs per MB. Adjacent MBs with high coding cost are called "Hold-MB" and can be held from being processed, until another neighboring edge is available for prediction. Encoding comprises marking a MB with high coding cost for deferred prediction. This MB is skipped while the other MBs are encoded. When a further adjacent MB was encoded, the marked MB is predicted based on the adjacent MBs. Since a decoder receives the deferment marks and uses the same growth pattern, it follows the encoder, and predicts and decodes correctly.

30 Claims, 5 Drawing Sheets

(51) Int. Cl.
H04N 19/174 (2014.01)
H04N 19/102 (2014.01)
H04N 19/70 (2014.01)
H04N 19/176 (2014.01)
H04N 19/147 (2014.01)
H04N 19/159 (2014.01)
H04N 19/61 (2014.01)
H04N 19/11 (2014.01)
H04N 19/593 (2014.01)
H04N 19/46 (2014.01)
H04N 19/129 (2014.01)

(52) U.S. Cl.
CPC ... *H04N19/00884* (2013.01); *H04N 19/00278* (2013.01); *H04N 19/00175* (2013.01); *H04N 19/00218* (2013.01); *H04N 19/00781* (2013.01); *H04N 19/00042* (2013.01); *H04N 19/00763* (2013.01); *H04N 19/00545* (2013.01); *H04N 19/00109* (2013.01)

(56) References Cited

U.S. PATENT DOCUMENTS

| | | | | |
|---|---|---|---|---|
| 2004/0008766 | A1* | 1/2004 | Wang et al. | 375/240.01 |
| 2006/0002466 | A1* | 1/2006 | Park | 375/240.03 |
| 2006/0093043 | A1* | 5/2006 | Kashima et al. | 375/240.24 |
| 2006/0126730 | A1 | 6/2006 | Arakawa et al. | |
| 2007/0195888 | A1 | 8/2007 | Sabeti | |
| 2009/0060045 | A1* | 3/2009 | Tateno | 375/240.16 |

OTHER PUBLICATIONS

Lim, C-S. et al., "Adaptive Macroblock Scanning", Joint Video Team (JVT) of ISO/IEC MPEG & ITU-T VCEG (ISO/IEC JTC1/SC29/WG11 and ITU-T SG16 Q6), 5$^{th}$ Meeting: Geneva, CH, Oct. 9-17, 2002, No. JVT-E101, pp. 1-14.

European Search Report Dated: May 19, 2010.

Cheung et al., "Highly parallel rate distortion optimized Intra-Mode Decision on Multicore Graphics Processors", IEEE Trans. on Circuits and Systems for Video Technology, vol. 19, No. 11, pp. 1692-1703, Nov. 1, 2009.

La et al., "Fast mode decision for intra prediction in H.264/AVC encoder", IEEE International Conference on Image Processing, ICIP 2007, San Antonio, TX, USA, Sep. 16-19, 2007, pp. 321-324.

Ji et al., "BP network based fast mode decision algorithm for intra prediction in H.264 video coding", Computer Engineering and Applications, vol. 44, No. 13, pp. 100-102, May 1, 2008.

Kim et al., "Efficient intramode SKIP detection algorithm for H.264/AVC video encoder", Optical Engineering, vol. 45, No. 9, pp. 97008-97008-5, Sep. 2006.

Kondo S., "Video coding with hybrid intra prediction for H.264/AVC", Electronics and Communications in Japan, Part 3 (Fundamental Electronic Science), vol. 90, No. 2, pp. 50-62, 2007.

Qinqlei et al., "Fast selective algorithm of intra prediction for H.264/AVC", Journal of Beijing University of Aeronautics and Astronautics, vol. 33, No. 2, pp. 219-223, Feb. 2007.

* cited by examiner

METHOD AND APPARATUS FOR IMAGE ENCODING USING HOLD-MBS, AND METHOD AND APPARATUS FOR IMAGE DECODING USING HOLD-MBS

CROSS-REFERENCE TO RELATED APPLICATIONS

This application claims the benefit, under 35 U.S.C. §119 of EP Patent Application No. 09305827.9, filed Sep. 10, 2009.

FIELD OF THE INVENTION

This invention relates to a method for image encoding, a method for image decoding, an apparatus for image encoding and an apparatus for image decoding.

BACKGROUND OF THE INVENTION

In H.264/AVC, macroblocks (MBs) in one frame are coded in raster scan order from one starting macroblock in left-up position. Each MB is coded one by one serially, no matter what the rate-distortion (R-D) cost of the coded MB is. FIG. 1 shows the raster scan order that H.264/AVC uses to implement intra prediction. The macroblock with bold font is the starting macroblock in H.264/AVC. There is only one starting MB per image.

Having multi-core processing architectures available, it is desirable to improve the parallelism of the intra prediction algorithm used in H.264/AVC, and to find the optimal prediction path of a video frame so as to improve the coding and compression performance for intra frames.

SUMMARY OF THE INVENTION

The present invention provides a MB-adaptive based intra prediction that is suitable, among others, for H.264/AVC.

According to one aspect of the invention, a frame can be coded starting from at least one starting macroblock (seed MB) that is intra encoded, and continuing with subsequent macroblocks that are intra predicted, wherein a predefined prediction spread pattern (called growth pattern herein) is used that comprises prediction of two or more neighbouring MBs per current MB simultaneously.

The term "neighbouring" refers herein only to such MBs that have a common edge with a current MB, irrespective whether they are above, below, left or right of the current MB.

Further, according to one aspect, macroblocks with high R-D cost (coding cost) can be held from being processed until at least one more neighbouring edge is ready and available for prediction. Then the prediction for these MBs is simpler and can be achieved at a lower coding cost. Such type of MB is called "Hold-MB" herein.

Since the encoder and the decoder need to use the same seed MBs and prediction order, both are predefined. They may be implicitly known to the encoder and decoder, e.g. through a standard. In one embodiment, the growth pattern is such that for each current MB three adjacent MBs are selected for the next prediction cycle (except on image edges).

According to one aspect of the invention, the encoding comprises steps of determining for at least one MB that the coding cost according to the selected prediction direction is high (e.g. higher than a threshold), and upon the determining marking said at least one MB for deferred prediction. As a consequence, the encoding of said at least one MB is skipped, while the other MBs are encoded, until at least one further adjacent MB of said at least one marked MB is encoded. Then, said at least one marked MB is predicted based on the (now at least two) already encoded adjacent MBs.

The Hold-MBs are such exceptional MBs for which it is not optimal to use the predefined growth pattern, while usually the predefined growth pattern provides a good coding efficiency. By marking these MBs as Hold-MBs for deferred prediction, an element of flexibility is introduced to make the idea of predefined growth pattern more flexible.

According to one aspect of the invention, a frame is coded from multiple seed macroblocks simultaneously, wherein the seed macroblocks can be intra predicted. Since the proposed intra prediction method will remove the prediction dependency of macroblocks within a coded frame, the method can be effectively implemented on a many-core platform, such as many core CPU platforms, GPGPU, Cell processors, etc.

An advantage of the proposed method is that it is much more efficient in coding performance and better suitable for implementation on parallel processing architectures.

According to one aspect of the invention, a method for encoding image data comprises steps of
predicting MBs from respective adjacent MBs, wherein the predicting starts from at least one start point MB (or seed MB) and wherein the prediction direction for any one MB is selected according to a predefined growth pattern to be left, right, up or down, determining for at least one MB that the coding cost according to the selected prediction direction is higher than a threshold, upon said determining, marking said at least one MB for deferred prediction and skipping the encoding of said at least one MB, encoding the MBs of the image, except said at least one MB marked for deferred prediction, comprising steps of determining residual data according to said predicting, and encoding the residual data, predicting said at least one marked MB after at least one further adjacent MB of said at least one marked MB was encoded, and encoding the marked MBs of the image, wherein the resulting encoding data include said mark.

According to another aspect, a method for decoding encoded image data comprises steps of
extracting data for at least one start point MB, extracting for one or more further MBs residual data, extracting for at least one of the further MBs an indication being a mark for deferred prediction, decoding said further MBs, wherein the decoding starts from said start point MB and proceeds in the order of a predefined growth pattern that includes prediction directions of left, right, up and down, the decoding comprising steps of predicting said further MBs from one or more already decoded adjacent MBs according to the growth pattern and adding said residual data, wherein the predicting of said at least one MB marked for deferred prediction is skipped,
determining that, for said at least one MB marked for deferred prediction, a further adjacent MB was decoded, and upon said determining, decoding the at least one marked MB according to its residual data and the at least two available decoded adjacent MBs.

According to a further aspect, an apparatus for encoding image data comprises
first prediction means for predicting MBs from respective adjacent MBs, wherein the predicting starts from at least one start point MB and wherein the prediction direction for any one MB is selected according to a predefined growth pattern that comprises prediction in left, right, up and down directions, first determining means for determining for at least one MB that the encoding cost according to the selected prediction direction is higher than a threshold, marking means for marking, upon said determining, said at least one MB for deferred prediction, first encoder for encoding the MBs of the image, except said at least one MB marked for deferred prediction, comprising residual determining means for determining residual data according to said predicting, and first encoding means for encoding the residual data, wherein the first encoder skips the at least one MB that is marked for deferred prediction, second determining means for determining that at least one further adjacent MB of said at least one marked MB was encoded; second prediction means for predicting said at least one marked MB after at least one further adjacent MB of said at least one marked MB was encoded, and second encoding means for encoding the marked MBs of the image, wherein the resulting encoding data include said mark.

According to yet a further aspect, an apparatus for decoding encoded image data comprises extraction means for extracting data of at least one start point MB, residual data of one or more further MBs and, for at least one of the further MBs, an indication being a mark for deferred prediction, first decoder for decoding said further MBs, wherein the decoding starts from said start point MB and proceeds in the order of a predefined growth pattern that includes prediction in left, right, up and down directions, wherein the decoder comprises first determining means for determining from said indication that the prediction and reconstruction of said at least one MB marked for deferred prediction is to be deferred;

first decoder comprising prediction means for predicting said further MBs from one or more already decoded adjacent MBs according to the growth pattern and reconstruction means for adding said residual data, wherein upon a signal from said determining means the prediction and reconstruction of said at least one MB marked for deferred prediction is skipped, second determining means for determining that, for said at least one MB marked for deferred prediction, said first decoder decoded a further adjacent MB, and second decoder for decoding, upon said determining, the at least one marked MB according to its residual data and the at least two available decoded adjacent MBs.

According to one aspect, an encoded image or video signal comprises at least one indication for deferred intra prediction of a MB.

Advantageous embodiments of the invention are disclosed in the dependent claims, the following description and the figures.

BRIEF DESCRIPTION OF THE DRAWINGS

Exemplary embodiments of the invention are described with reference to the accompanying drawings, which show in FIG. 1 the raster scan order used in H.264/AVC in intra prediction.

DETAILED DESCRIPTION OF THE INVENTION

One principle of the present invention is that multiple macroblocks of an image (e.g. video frame) are predicted simultaneously, instead of encoding one MB at a time to perform intra prediction. The (up to four) neighbour MBs of each coded MB can be predicted using their common edges. A hold-MB mechanism is introduced to allow the prediction of a MB, which would have to be coded with high R-D cost, to be automatically deferred until more neighbouring edges are available. Therefore, better compression efficiency can be obtained.

In one embodiment, instead of using one seed macroblock to perform intra prediction, multiple macroblocks are chosen as seed macroblocks of an image. The four neighbour MBs of each coded seed MB can be predicted using their common edges. Note that the terms "seed MB", "starting MB", "seed starting MB" and "seed starting point" are used equivalently herein.

Figure 1:
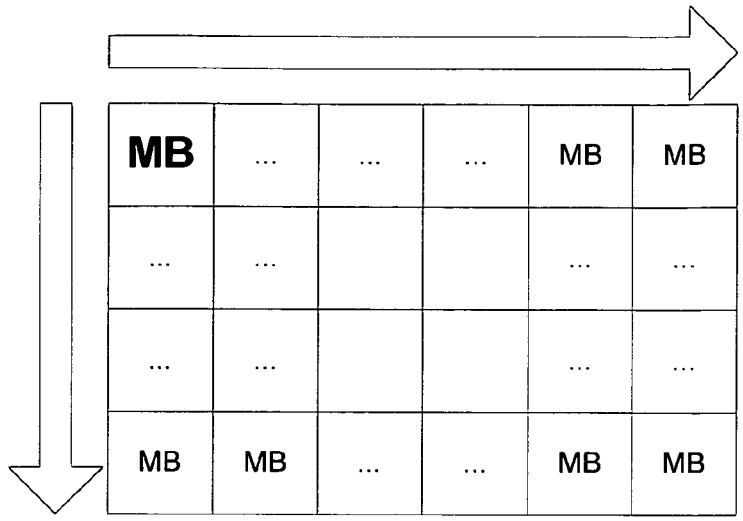
Figure 2:
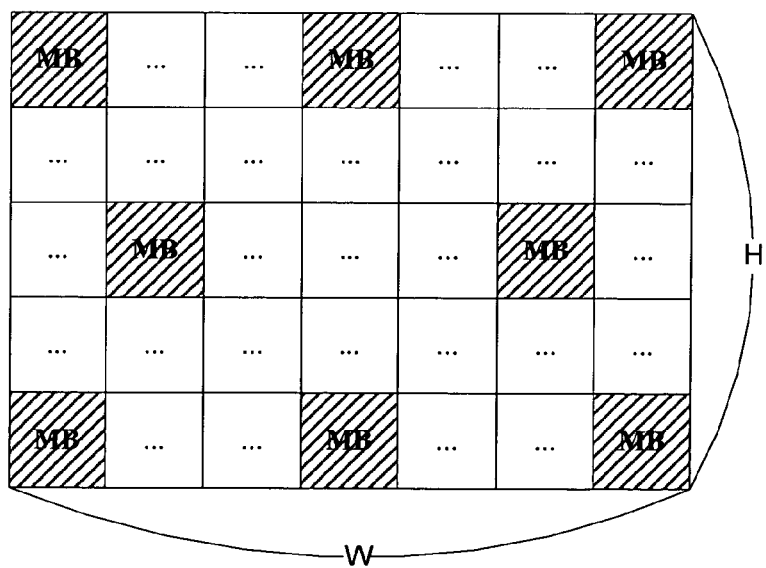
FIG. 2 positions of an exemplary plurality of seed MBs (starting macroblocks) in a frame.

In H.264/AVC, only one MB (at left-up position) of each frame is used as seed MB. In one embodiment of the present invention, multiple seed MBs are chosen to perform intra prediction simultaneously. Seed MBs can be randomly distributed in a frame, or selected by a rule, or pre-defined. The more seed MBs are chosen, the more parallelism is introduced. In FIG. 2 a sample seed MB setting is shown as an example in an image with W*H MBs. Shaded MBs are sample seed MBs. The number of seed MBs per image depends on the image size and the available processing capabilities for parallel processing. For today's common image size and parallel processors, an exemplary number of seed MBs is between 15 and 25.

Since the encoder and the decoder need to use the same prediction order, a growth pattern is predefined. The growth pattern may be implicitly known to the encoder and decoder, e.g. it may be standardized. In one embodiment, the growth pattern is such that for each current MB three adjacent MBs are selected for the next prediction cycle.

In one embodiment, various different growth patterns are predefined, and an encoder selects one particular of the growth patterns and sends an indication to the decoder indicating which growth pattern it used for encoding. The same applies to seed MBs and their positions.

Figure 3:
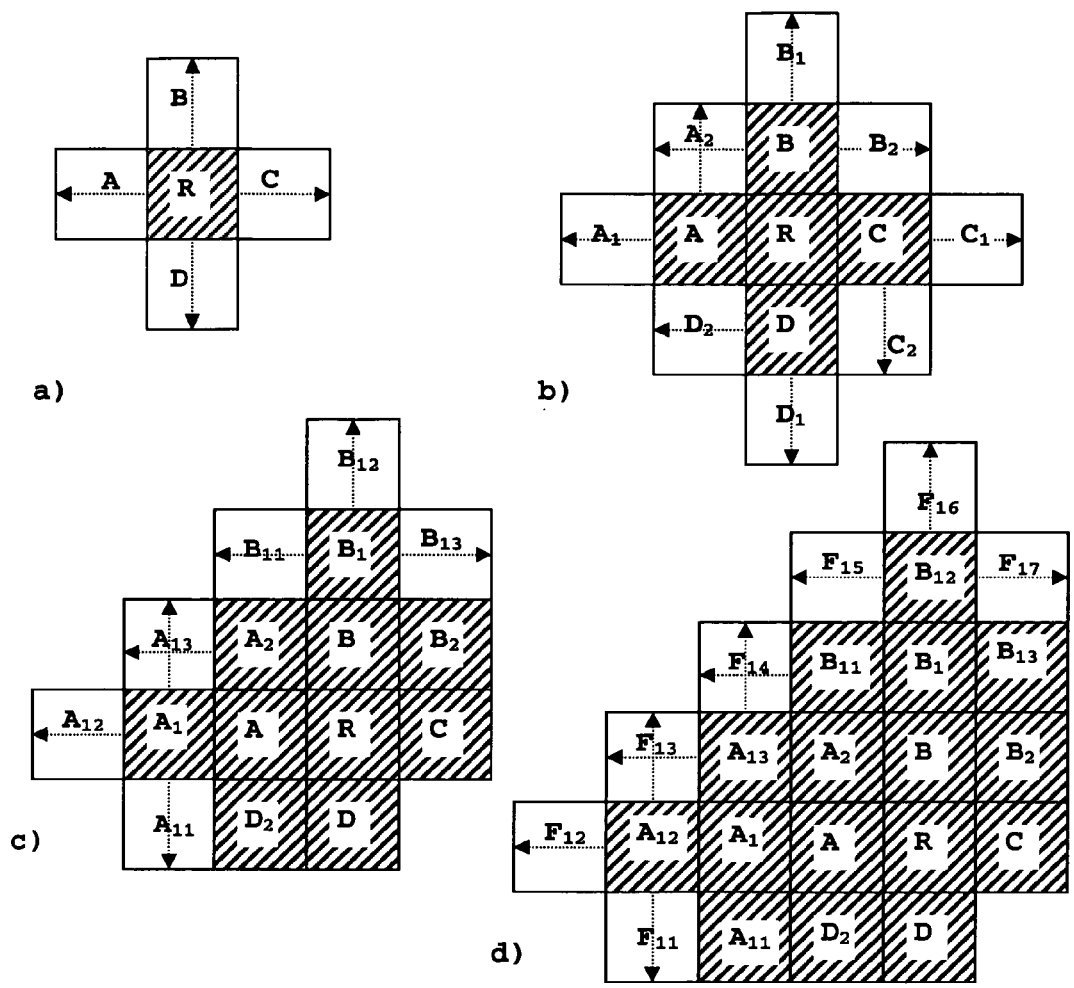
FIG. 3 an exemplary growth pattern for intra prediction starting from a seed MB.

FIG. 3 shows an exemplary growth pattern. A growth pattern defines in which spatial direction the prediction spreads. In the growth pattern shown in FIG. 3, the prediction spreads evenly in all directions (up,down,left,right) of the seed macroblock R. The first step of the growth pattern is shown in FIG. 3 a). Starting from the seed MB R, all four adjacent MBs (or neighbouring MBs) A,B,C,D in left, right, upper and lower direction are predicted. Due to the employment of parallel processing, all of them are predicted simultaneously from the seed MB R. Directional prediction is used, including up and left prediction (other than in H.264/AVC). As usual, each predicted MB is compared with its original ("parent" or reference) MB, a difference (residual) is determined, and the residual is encoded. In order to serve as references for predicting further MBs, the MBs are then reconstructed.

In a second step shown in FIG. 3 b), each of the first-generation MBs A-D (either original or reconstructed) serves as reference for predicting second-generation MBs. Each second-generation MB is predicted from the first-generation MB(s) with which it has a common edge. If there are two first-generation MBs with which it has common edges, different coding modes are possible. The coding costs of these different modes are compared, and the solution with the least coding cost is used.

In this exemplary growth pattern, the prediction direction is preferably radial. That is, e.g. a MB $C_1$ that is right of C is predicted from C. A MB $C_2$ that is below C and right of D may be predicted from C, from D or from both C and D. A comparison of the different intra coding modes reveals e.g. that a prediction from C is cheaper (i.e. results in less data) than a prediction from D. This depends on the local image contents. Thus, $C_2$ is predicted from C, a residual is generated and encoded, and an intra coding mode indication is included in the encoding. This ensures correct decoding of the MB. Other second-generation MBs $A_1,B_1,D_1,A_2,B_2,C_2,D_2$ are predicted from their respective parent MBs in the same manner. As an example, a second-generation MB $A_2$ that has two adjacent first-generation MBs A,B may use both for prediction, which results in spatially diagonal (up-left) intra-prediction. Thus, in the second step shown in FIG. 3 b), each reconstructed MB of the previous generation is used for predicting two or more MBs of a current generation.

In a third step shown in FIG. 3 c), second-generation MBs $A_1,A_2,B_1,B_2,D_2$ are used for predicting third-generation MBs $A_{11},A_{12},A_{13},B_{11},B_{12},B_{13}$. Note that in FIG. 3 c) only a part of the growth pattern of a single seed starting point R is shown, while some second-generation MBs $C_1,C_2,D_1$, are omitted. Again, each next-generation MB has one or two adjacent MBs of a current generation available from which it is predicted. Thus, also in the third step shown in FIG. 3 b), and likewise in subsequent steps as in FIG. 3 d), each reconstructed MB of the previous generation can be used for predicting two or more MBs of the current generation. Depending on the image contents, it is possible that a previously reconstructed MB is used for predicting only one MB, or is not at all used for predicting MBs.

A general advantage of the described method is that all next-generation predictions may be performed simultaneously, since they are independent from each other. The number of simultaneous predictions increases according to $$a_n=(4+a_{n-1})*S \quad (1)$$

with n being the generation, $a_n$ the number of predicted MBs per generation and S the number of seed starting points. Examples are shown in Tab. 1 (e.g. for one seed MB, there are four $1^{st}$-generation MBs, eight $2^{nd}$-generation MBs, twelve $3^{rd}$-generation MBs etc.).

TABLE 1

Number of parallel predictions for one seed MB (center column) and for S seed MBs (right column)

| n | $a_n/S$ | $a_n$ |
| --- | --- | --- |
| 0 | 1 | S |
| 1 | 4 | 4 * S |
| 2 | 8 | 8 * S |
| 3 | 12 | 12 * S |
| ... | ... | ... |
| N | $4+a_{N-1}$ | $(4+a_{N-1})*S$ |

Figure 4:
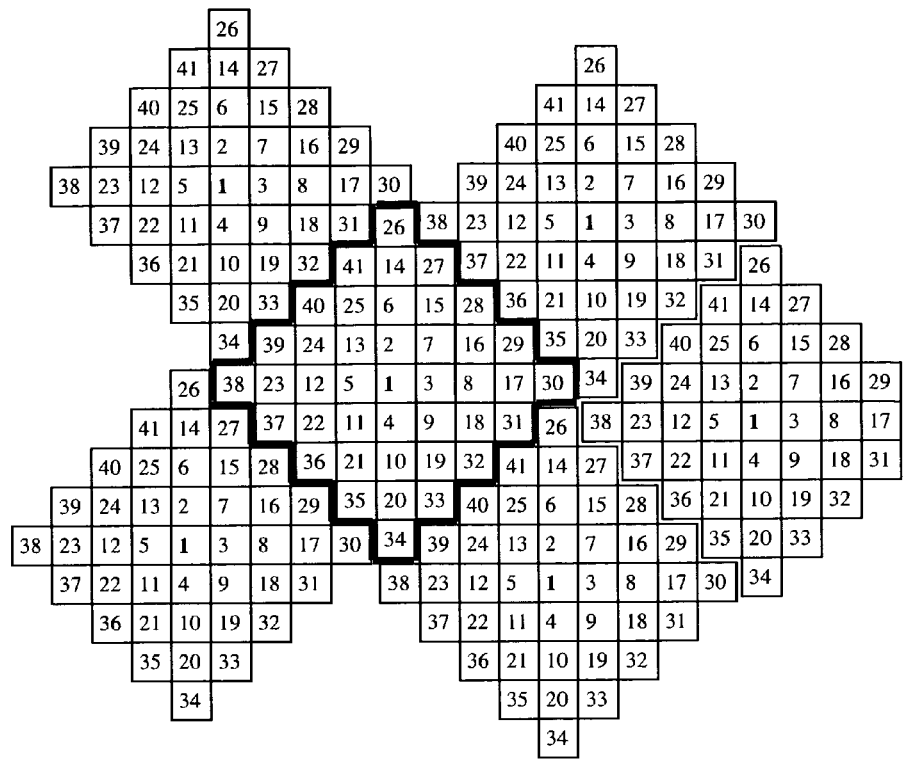
FIG. 4 coverage of an image portion through growth patterns starting from multiple seed MBs.

Though the growth pattern of a particular seed starting point is not restricted to a limited area, it may typically result in principle in a rhombic form. It ends when the edge of the image is reached, or when it meets another growth pattern. Deviations of the form are possible, depending on the image contents. This allows the encoding algorithm to be flexible and to find prediction directions for a good coding solution. When multiple seed starting points are used, they may be selected such that the rhomb-like forms of different seed starting points complement each other. An example is shown in FIG. 4, where six MBs denoted with 1 are seed MBs, and their respective adjacent MBs are determined in the order as shown. E.g. in a first step, the adjacent MBs 2, . . . , 5 for the first-generation prediction are (preferably simultaneously) determined, and (preferably simultaneously) predicted as described above. In a second step, the new adjacent MBs 6, . . . , 13 for the second-generation prediction are (preferably simultaneously) determined, and (preferably simultaneously) predicted as described above. If the number of simultaneous processes gets too high for the currently available processing capabilities, it is at any time possible to split the simultaneous processing into subsequent processes. E.g. instead of 1000 simultaneous processes it is possible to perform a sequence of 2*500 simultaneous processes etc.

One advantage of the described growth pattern is that generally no additional directional information is required for the pattern to spread, except the intra prediction mode of the single MBs. However, it has been found that sometimes it is advantageous to modify the spreading slightly, and provide some additional guiding information.

According to one aspect of the invention, an additional degree of freedom can be added to the spreading process by using Hold-MBs, as described in the following. When a MB with relatively high R-D cost (as compared with other MBs), e.g. larger than a threshold, is encountered, it is held from being processed. Such MBs are called Hold-MBs. Their prediction is deferred until at least one further adjacent MB is available for prediction. An indication is used to mark such Hold-MBs. In one embodiment, a flag is encoded for each Hold-MB, and prediction of such Hold-MB is deferred. The algorithm proceeds normally with the other MBs, as described above. Since the decoder needs to follow the encoder, the prediction deferment mark is also encoded in the encoder output signal. When one or more additional MBs adjacent to a Hold-MB are encoded (and therefore during the decoding will be available for prediction), the Hold-MB is predicted from its available adjacent MBs. Usually this results in a better and more precise prediction. Note that the MBs are decoded in the order of their encoding. Thus, the time for resolving the hold of a Hold-MB and predicting it can be independently detected in the coder and the decoder.

In one embodiment, a MB marked as Hold-MB is predicted when at least one additional adjacent MB is available, irrespective of the coding cost. Usually the additional adjacent MB will be used for prediction.

In another embodiment, the prediction may still be deferred if the coding cost is still above the threshold and another adjacent MB of the Hold-MB is not encoded yet. In this case, the prediction will be done when enough adjacent MBs are available to enable prediction with coding cost below the threshold, or (latest) when all adjacent MBs of the Hold-MB are encoded.

In one embodiment, the at least one additional adjacent MB is always used for predicting the Hold-MB.

In one embodiment, the prediction quality and coding cost of different intra coding modes is newly compared with each new additional adjacent MB, and the best intra coding mode is determined using R-D optimization.

The decoder needs to use the same mode as the encoder. If different modes of the above-described modes can be used, a respective mode indication for the actually used mode is encoded in the encoder and detected in the decoder, e.g. as header information, management information, or similar.

The threshold of R-D cost for Hold-MBs can be derived e.g. in one of the following ways. In one embodiment, an initial value is set to be the average R-D cost of all seed MBs.

In one embodiment, the threshold is a fixed value, which can be predefined or derived before encoding frames from history information that is obtained from empirical data, statistical analysis, pre-analysis of seed MBs per input frame, etc.

In another embodiment, the threshold is adaptive on MB level, frame level or GOP level. Taking MB level as an example, the current threshold $thr_{cur}$ of R-D cost to defer prediction of a MB can be calculated as $$thr_{cur}=w_1*thr_{his}+w_2*rd\_cost_{last}(\text{with } w_1+w_2=1) \quad (2)$$

where $thr_{cur}$ is the R-D cost threshold for the current MB, $thr_{his}$ is the R-D cost threshold for the last coded MB, and $rd\_cost_{last}$ is the R-D cost to code the last MB. $w_1$ and $w_2$ are weight coefficients, which can be defined by customization or using presets. Examples are $w_1=0.5/w_2=0.5$, $w_1=0.3/w_2=0.7$ or $w_1=0.9/w_2=0.1$. Threshold calculation and usage needs not be done for decoding.

Figure 5:
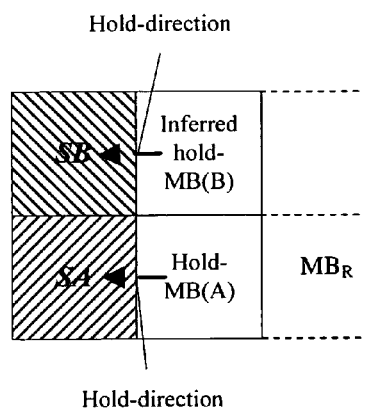
FIG. 5 the principle of inferred hold-MBs.

In one embodiment as shown in FIG. 5, an advanced method for determining prediction deferment for a MB is used. For a current un-coded MB that has only one reconstructed neighboring edge available, it can be inferred whether it will be marked as Hold-MB or not, without actually encoding it. A variable "hold direction" is introduced to indicate the direction of a Hold-MB to its parent MB (or root). For the current MB, it is checked whether or not the neighboring MB is a Hold-MB. If it is a Hold-MB, and the direction of the current MB to its root is the same as the hold-direction of one of its neighboring Hold-MBs, then the current MB is marked as Hold-MB. In FIG. 5, a previously encoded macroblock SA is the root of two macroblocks A and SB. Macroblock SB is the root of macroblock B. Macroblock A is set to be Hold-MB, with hold-direction left. That is, its prediction from only macroblock A alone was determined to be too expensive, and therefore deferred. Macroblock B is inferred to be a Hold-MB since it has the same prediction direction as its adjacent macroblock A which is already marked as Hold-MB.

In one embodiment, macroblock B is inferred to be a Hold-MB without additional calculations, just because the direction from macroblock B to its root macroblock SB is the same as the hold-direction of the adjacent Hold-MB A. Advantages of this embodiment are that Hold-MBs can be determined easily, the number of predictions is reduced and no additional calculation operations or modes are required. The Hold-MBs may be predicted, and the hold condition be resolved, when a macroblock $MB_R$ from another edge is available. Though in FIG. 5 such resolving macroblock $MB_R$ is shown to come from the right edge, it may in this case also come from the lower edge, or from the upper or right edge of macroblock B. It may come from the same or from another growth pattern.

In another embodiment, the above-described initial process for determining Hold-MBs is performed again for macroblock B. In one embodiment, a different threshold $thr_{cur}$ and/or modified weight parameters $w_1,w_2$ are used. A higher coding cost than for a single Hold-MB may be acceptable because resolving the hold condition will result in more than one Hold-MB being predicted. An advantage of this embodiment is that the hold conditions will be resolved relatively soon, and thus the Hold-MBs will be predicted and coded earlier. This reduces the amount of simultaneously existing Hold-MBs.

The concept of inferring some MBs to be Hold-MBs is to prevent bad prediction results from undesired predictors, according to the previous encoding results. Waiting for more predictors for a Hold-MB will result a better prediction performance (and thus improved encoding performance).

Generally it is not necessary to maintain a list of the un-coded Hold-MBs. In one embodiment, it is checked for each adjacent MB of each current MB whether or not it is already encoded, and latest when an adjacent MB is not encoded and has all four neighbours available then it will be encoded. This may be irrespective of the coding cost, or with determining the best coding mode from among modes that use one, some or all of its adjacent MBs.

In one embodiment, the encoding process is a two-pass procedure. The first pass performs prediction, coding and reconstruction of each MB. In case a MB is held from being predicted, then it will be predicted later. The second pass performs entropy coding to all MBs of the frame. When a MB is encountered that is marked as Hold-MB, then an indication flag_hold_MB is inserted into the bit-stream. It tells the decoder to perform entropy decoding to this MB, but not predict it yet. Prediction of this MB will be done when more neighbouring edges are available, which is supervised by the decoder autonomously, and ensures synchronous processing with the encoder. In one embodiment, the encoder outputs a bit-stream in a fixed order (the pre-defined growth pattern order). The decoder follows the same order. For a Hold-MB, the decoder will only perform entropy decoding and wait for more edges to finish the decoding process for this MB. Therefore the MB order in the bit-stream is a fixed order, regardless of the macroblock type (Hold-MB or not Hold-MB).

Figure 6:
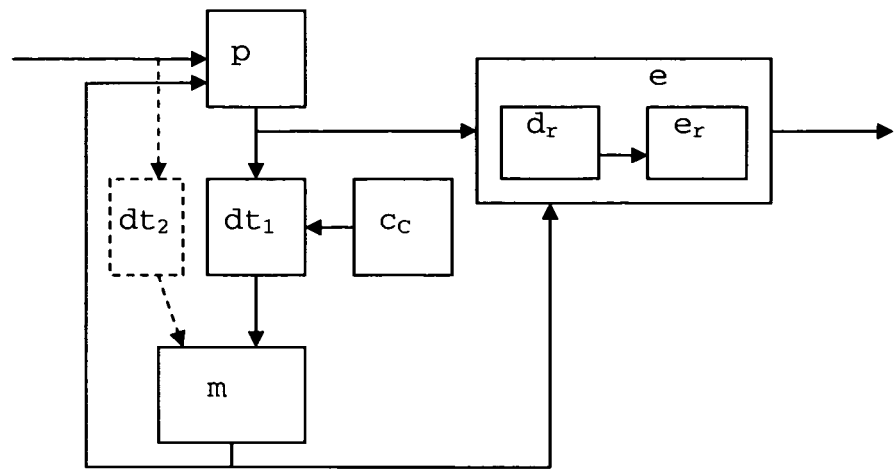
FIG. 6 a flow-chart of the encoding method.

FIG. 6 shows a flow-chart of one embodiment of the encoding aspect of the invention, wherein a method for encoding image data comprises steps of predicting p MBs from respective adjacent MBs, wherein the predicting starts from at least one start point MB and wherein the prediction direction for any one MB is selected according to a predefined growth pattern to be left, right, up or down, determining $dt_1$ for at least one MB that the coding cost (when using the prediction direction) is higher than a threshold, and upon said determining, marking m said at least one MB for deferred prediction and skipping the encoding of said at least one MB. Further steps are encoding e the MBs of the image, except said at least one MB marked for deferred prediction. The encoding e comprises steps of determining $d_r$ residual data according to said prediction, and encoding $e_r$ the residual data, predicting p' said at least one marked MB after at least one further adjacent MB of said at least one marked MB was encoded, and encoding e the marked MBs of the image, wherein the resulting encoding data include said mark. In an initial step (not shown), the neighbour MBs are determined. The predicting steps p,p' are similar but not identical, as described above, but are shown as only one block p for simplicity.

The encoding method further comprises a step of determining $dt_2$ for a current MB that an adjacent MB was marked for deferred prediction. In one embodiment, the step comprises (before the step of determining $dt_1$ for at least one MB that the coding cost is higher than a threshold) determining $dt_3$ that the adjacent MB uses the same prediction direction as the current MB, and upon said determining, marking the current MB also for deferred prediction.

In one embodiment, the encoding method further comprises a step of calculating $c_c$ said coding cost threshold according to the current image, as described above (see eq. (2)).

In one embodiment, a method for encoding video or image data comprises steps of
(a) selecting multiple predefined start point MBs as current MBs, and performing simultaneously for all start point MBs steps of
  (b1) determining an intra coding mode, performing the intra coding and reconstructing each start point MB; and
  (b2) performing a first loop by repeating the steps of
    (c1) selecting, according to a pre-defined growth pattern, at least two neighboring MBs of each current MB simultaneously, each being in up, down, left or right direction of a current MB;
    (c2) releasing the current MBs and setting the selected MBs as current MBs; for a plurality of the current MBs, performing simultaneously the steps of
      (d1) estimating for a current MB coding costs according to a plurality of different intra coding modes based on the reconstructed neighbor MBs;
      (d2) determining if the estimated coding cost of at least one encoding mode is below a threshold;
      (d3) if so (i.e. at least one estimated coding cost is below a threshold), selecting an intra coding mode for the current MB, encoding the MB using the selected encoding mode and reconstructing the encoded MB;
      (d4) otherwise (i.e. if no estimated coding cost is below the threshold), storing a prediction postponement indication (flag_hold_mb) for the current MB, and terminating and restarting the first loop for the current MB;
      (d5) resolving previous prediction postponement by determining if for at least one neighbor MB of the current MB an indication for prediction postponement (flag_hold_mb) was stored, and if so, determining an intra coding mode for said neighboring MB and coding the neighboring MB according to the determined mode;
      (d6) if at least one current MB has at least one neighbor MB that was not encoded and has no prediction postponement indication (flag_hold_mb) stored, terminating and restarting the first loop; otherwise finishing the first loop; and
(e) after finishing the first loop, performing entropy encoding of intra coded MB data for each MB, wherein the prediction postponement indication (flag_hold_mb) is included in the encoded data, for usage at the decoder.

Figure 7:
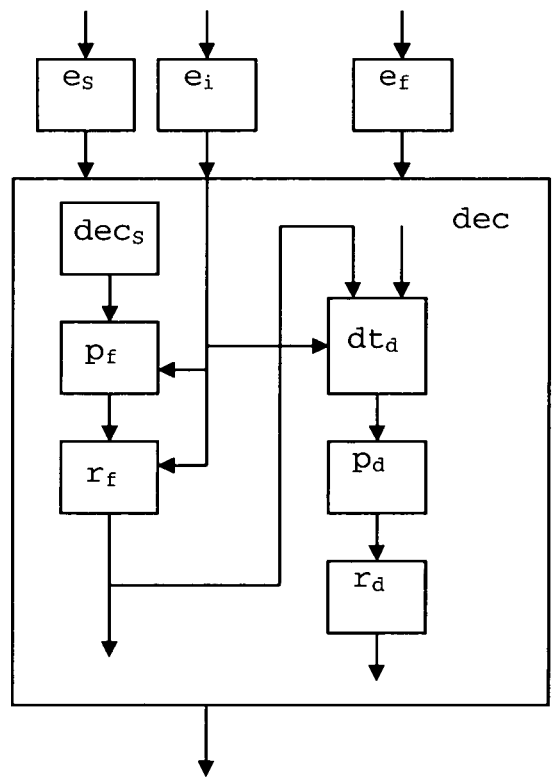
FIG. 7 a flow-chart of the decoding method.

FIG. 7 shows a flow-chart of one embodiment of the decoding aspect of the invention, wherein a method for decoding encoded image data comprises steps of
extracting $e_s$ data for at least one start point MB;
extracting $e_f$ for one or more further MBs residual data;
extracting $e_i$ for at least one of the further MBs an indication serving as a mark for deferred prediction;
decoding dec said start point MB and further MBs, wherein the decoding starts $dec_s$ from said start point MB and proceeds in the order of a predefined growth pattern that comprises prediction directions of left, right, up and down, the decoding comprising steps of predicting $p_f$ said further MBs from one or more already decoded adjacent MBs according to the growth pattern and adding $r_f$ said residual data, wherein the predicting of said at least one MB marked for deferred prediction is skipped (or actually: deferred);
determining $dt_d$ that, for said at least one MB marked for deferred prediction, a further adjacent MB was decoded;
upon said determining, decoding $p_d, r_d$ the at least one marked MB according to its residual data and the at least two available decoded adjacent MBs.

In one embodiment of the encoding method or decoding method, the at least one seed MB is not on the edge of the image. In one embodiment, multiple seed MBs are evenly distributed over the image, i.e. with maximum distance from each other.

Figure 8:
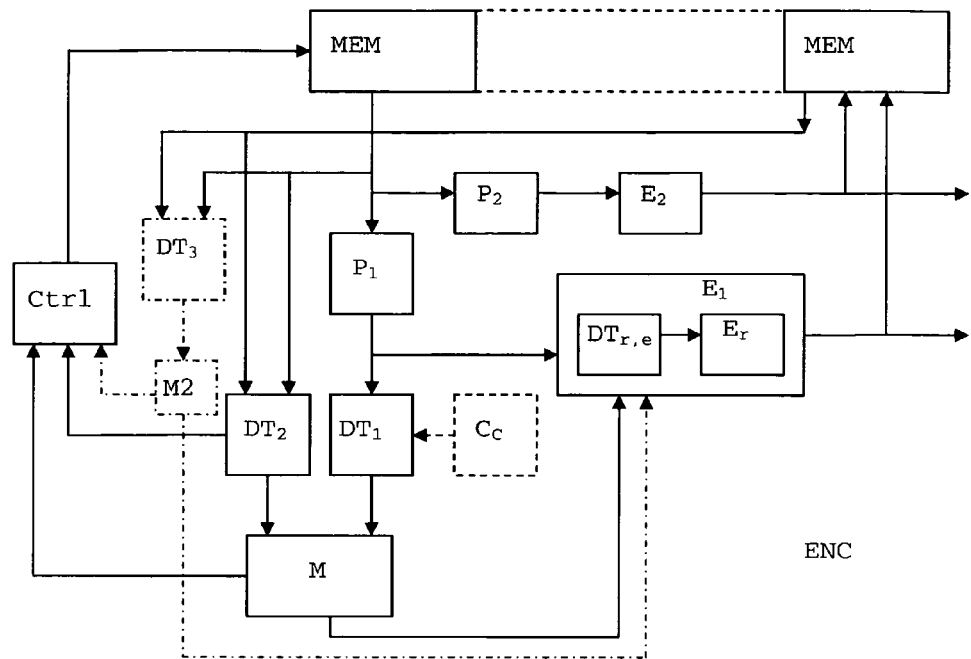
FIG. 8 an exemplary block diagram of an encoding apparatus.

FIG. 8 shows an embodiment of the encoding aspect of the invention, wherein an apparatus ENC for encoding image data comprises first prediction means $P_1$ for predicting MBs from respective adjacent MBs, wherein the predicting starts from at least one start point MB and wherein the prediction direction for any one MB is selected according to a predefined growth pattern that comprises prediction in left, right, up and down directions,
first determining means $DT_1$ for determining for at least one MB that the encoding cost according to the selected prediction direction is higher than a threshold,
marking means M for marking, upon said determining, said at least one MB for deferred prediction,
first encoder $E_1$ for encoding the MBs of the image, except said at least one MB marked for deferred prediction, the first encoder $E_1$ comprising residual determining means $DT_{r,e}$ for determining residual data according to said predicting and residual encoding means $E_r$ for encoding the residual data, wherein the first encoder $E_1$ skips the at least one MB that is marked for deferred prediction,
second determining means $DT_2$ for determining that at least one further adjacent MB of said at least one marked MB was encoded,
second prediction means $P_2$ for predicting said at least one marked MB after at least one further adjacent MB of said at least one marked MB was encoded, and
second encoding means $E_2$ for encoding the marked MBs of the image, wherein the resulting encoding data include said mark. In one embodiment, the residual determining performed in the residual determining means $DT_{r,e}$ comprises a comparison between the predicted and the original MB. In one embodiment, the second determining means $DT_2$ determines for a currently encoded MB that an adjacent MB was marked as Hold-MB, and sends a signal to a control unit Ctrl. The control unit Ctrl effectuates the retrieving of data of the Hold-MB from a memory MEM and providing it to the second prediction means $P_2$ and second encoding means $E_2$, so that the Hold-MB can be predicted and coded. Note that the second prediction means $P_2$ and second encoding means $E_2$ may be identical to the first prediction means $P_1$ and first encoding means $E_1$ although they are depicted separately here.

In one embodiment, the encoding apparatus further comprises third determining means $DT_3$ for determining for a current MB that an adjacent MB that uses the same prediction direction was marked for deferred prediction, and second marking means $M_2$ for marking the current MB for deferred prediction upon said determining.

Figure 9:
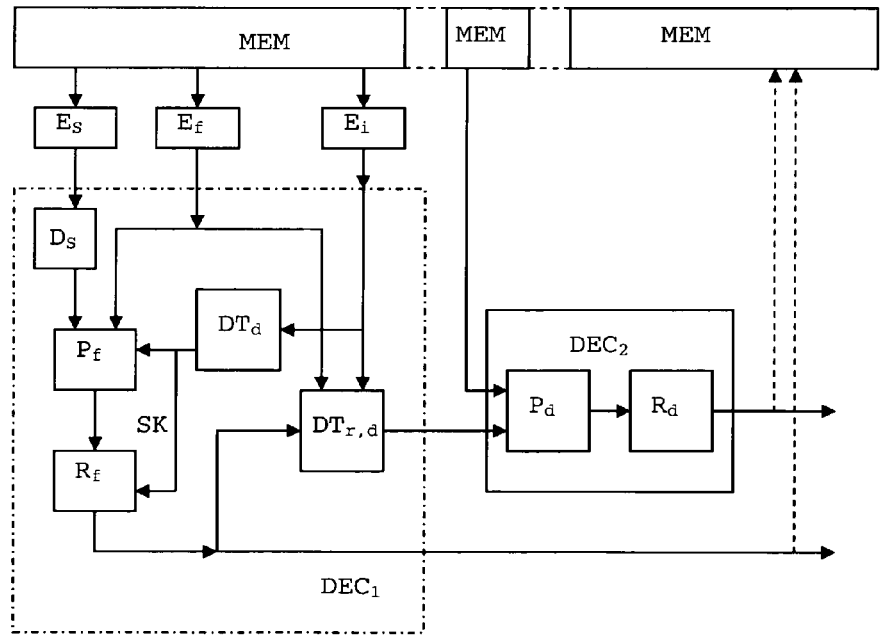
FIG. 9 an exemplary block diagram of a decoding apparatus.

FIG. 9 shows an embodiment of the decoding aspect of the invention, wherein an apparatus for decoding encoded image data comprises
extraction means $E_s, E_f, E_i$ for extracting data of at least one start point MB, residual data of one or more further MBs and, for at least one of the further MBs, an indication being a mark for deferred prediction,
first decoder $DEC_1$ for decoding said MBs, wherein the decoding starts $D_s$ from said start point MB and proceeds with decoding said further MBs in the order of a predefined growth pattern that includes prediction in left, right, up and down directions, wherein the first decoder comprises first determining means $DT_d$ for determining from said indication that the prediction and reconstruction of said at least one marked MB is to be deferred, prediction means $P_f$ for predicting said further MBs from one or more already decoded adjacent MBs according to the growth pattern and reconstruction means $R_f$ for adding said residual data, wherein upon a signal SK from said first determining means $DT_d$ the prediction and reconstruction of said at least one MB marked for deferred prediction is skipped, second determining means $DT_{r,d}$ for determining that, for said at least one MB marked for deferred prediction, a further adjacent MB was decoded in said first decoder, second decoder $DEC_2$ for decoding, upon said determining, the at least one marked MB according to its residual data and the at least two available decoded adjacent MBs. As is apparent to the skilled person, the extraction means $E_s, E_f, E_i$ may be a single means, or two or three separate means. The second decoder $DEC_2$ may comprise a prediction unit $P_d$ and a reconstruction unit $R_d$ for decoding the Hold-MBs. However, these may be identical to the above-mentioned prediction means $P_f$ and reconstruction means $R_f$.

In one embodiment, the encoding apparatus comprises an entropy coder for entropy encoding said encoded image data. In one embodiment, the decoding apparatus comprises an entropy decoder for entropy decoding said entropy encoded image data before image decoding. The decoder may receive its data from, and provide its data to, a memory MEM.

In one embodiment that is usable e.g. for MPEG coding or for H.264/AVC in particular, a single bit indicator is inserted in the macroblock_layer syntax table to indicate whether a macroblock is marked as a hold-MB or not.

various omissions and substitutions and changes in the apparatus and method described, in the form and details of the devices disclosed, and in their operation, may be made by those skilled in the art without departing from the spirit of the present invention. Although the present invention has been disclosed with regard to macroblocks, one skilled in the art would recognize that the method and devices described herein may be applied to other block sizes. It is expressly intended that all combinations of those elements that perform substantially the same function in substantially the same way to achieve the same results are within the scope of the invention. Substitutions of elements from one described embodiment to another are also fully intended and contemplated.

For example, the determining step in the encoding procedure may be considered as determining the status of a neighbour MB. If the neighbour MB is marked as a Hold-MB, the hold condition may in one embodiment be resolved immediately, so that both the current and the neighbouring MB are encoded. In another embodiment, the hold condition may be inferred for the current MB, under the conditions described above, so that both the current and the neighbouring MB are Hold-MBs. In the latter case, the inferring may be conditional, depending on the coding cost, and the coding cost threshold may be reduced.

Each feature disclosed in the description and (where appropriate) the claims and drawings may be provided independently or in any appropriate combination. Features may, where appropriate be implemented in hardware, software, or a combination of the two. Connections may, where appli-

TABLE 2

| Syntax example for H.264/AVC | | |
|---|---|---|
| 1 macroblock_layer( ) { | C | Descriptor |
| 2   mb_type | 2 | ue(v) \| ae(v) |
| 3   If( slice_type == 2 \|\| slice_type == 7 ) | | |
| 4     flag_hold_mb | 1 | ue(v) \| ae(v) |
| 5   if( mb_type == I_PCM ) { | | |
| 6     while( !byte_aligned( ) ) | | |
| 7       pcm_alignment_zero_bit | 2 | f(1) |
| 8     for( i = 0; i < 256 * ChromaFormatFactor; i++) | | |
| 9       pcm_byte[ i ] | 2 | u(8) |
| 10   } else { | | |
| 11     if( MbPartPredMode( mb_type, 0 ) != Intra_4x4 && MbPartPredMode( mb_type, 0 ) != Intra_16x16 && NumMbPart( mb_type ) == 4 ) | | |
| 12       sub_mb_pred( mb_type ) | 2 | |
| 13     Else | | |
| 14       mb_pred( mb_type ) | 2 | |
| 15     if( MbPartPredMode( mb_type, 0 ) != Intra_16x16 ) | | |
| 16       coded_block_pattern | 2 | me(v) \| ae(v) |
| 17     if( CodedBlockPatternLuma > 0 \|\| CodedBlockPatternChroma > 0 \|\| MbPartPredMode( mb_type, 0 ) == Intra_16x16 ) { | | |
| 18       mb_qp_delta | 2 | se(v) \| ae(v) |
| 19       residual( ) | 3\|4 | |
| 20     } | | |
| 21   } | | |
| 22 } | | |

An example of a macroblock_layer syntax is shown in Tab. 2. In an intra coded frame, a syntax element flag_hold_mb, e.g. a flag, indicates whether a current MB is marked as a Hold-MB (flag_hold_mb=1) or not (flag_hold_mb=0).

It will be understood that the present invention has been described purely by way of example, and modifications of detail can be made without departing from the scope of the invention.

While there has been shown, described, and pointed out fundamental novel features of the present invention as applied to preferred embodiments thereof, it will be understood that cable, be implemented as wireless connections or wired, not necessarily direct or dedicated, connections.

Reference numerals appearing in the claims are by way of illustration only and shall have no limiting effect on the scope of the claims.

What is claimed is:
1. A method for encoding image data, comprising:
predicting macroblocks from respective adjacent macroblocks, wherein multiple macroblocks that are adjacent up, down, left or right to a previously encoded macrob- lock are predicted simultaneously, and wherein the predicting starts from at least one start point macroblock, and wherein the prediction direction for any one macroblock is selected according to a predefined growth pattern within a current slice to be at least one of left and up and at least two of the multiple simultaneously predicted macroblocks that are adjacent to a previously encoded macroblock use different prediction directions within said current slice, the growth pattern defining in which spatial direction the prediction spreads;

determining for at least one macroblock that the coding cost according to the selected prediction direction is higher than a threshold;

upon said determining, marking said at least one macroblock for deferred prediction and skipping the encoding of said at least one macroblock marked for deferred prediction;

continuing with encoding one or more macroblocks of said current slice of the image, except said at least one macroblock marked for deferred prediction, comprising determining residual data according to said predicting, and encoding the residual data;

predicting said at least one marked macroblock for deferred prediction after at least one further macroblock of said current slice was encoded, the at least one further macroblock being adjacent to said at least one marked macroblock for deferred prediction; and encoding the marked macroblocks of the image, wherein the resulting encoding data include said mark.

2. The method according to claim 1, further comprising, before said determining for a current macroblock that an adjacent macroblock was encoded, determining that the adjacent macroblock was marked for deferred prediction and that the current macroblock uses the same prediction direction as the adjacent macroblock, and upon said determining, marking the current macroblock also for deferred prediction without determining its coding cost.

3. The method according to claim 1, further comprising calculating said coding cost threshold according to the current image, wherein if the coding cost threshold is derived on macroblock level, it is calculated from a previous coding cost threshold and the rate-distortion cost of the previous macroblock.

4. The method according to claim 1, wherein the at least one start point macroblock is not on the edge of the image.

5. The method according to claim 1, further comprising entropy encoding said encoded image data, and entropy decoding said entropy encoded image data before said image decoding.

6. The method according to claim 1, wherein the encoding or decoding starts from two or more start point macroblocks within said current slice simultaneously.

7. The method according to claim 1, wherein the predefined growth pattern is used for selecting the next macroblocks from said current slice for the predicting, and wherein the predefined growth pattern comprises selecting, for a current macroblock, three adjacent macroblocks in different of up, down, left and right directions.

8. A method for decoding encoded image data, comprising:
extracting data for at least one start point macroblock, the macroblock belonging to a current slice;

extracting for one or more further macroblocks residual data, the one or more further macroblocks also belonging to the current slice;

extracting for at least one of the further macroblocks an indication being a mark for deferred prediction;

decoding said start point macroblock and further macroblocks that are adjacent up, down, left or right to the start point macroblock and belong to the current slice, wherein the decoding starts from said start point macroblock and proceeds in the order of a predefined growth pattern that includes prediction directions of at least one of left and up, wherein the growth pattern defines in which spatial direction the prediction spreads, the decoding comprising predicting a plurality of said further macroblocks simultaneously from one or more already decoded adjacent macroblocks according to the growth pattern, wherein at least two macroblocks of the plurality of further macroblocks are predicted from any particular one previously decoded macroblock that belongs to the current slice using different prediction directions, and adding said residual data, wherein the predicting of said at least one macroblock marked for deferred prediction is skipped;

determining that, for said at least one macroblock marked for deferred prediction, a further adjacent macroblock of the current slice was decoded; and upon said determining, decoding the at least one marked macroblock according to its residual data and the at least two available decoded adjacent macroblocks.

9. The method according to claim 8, wherein the at least one start point macroblock is not on the edge of the image.

10. The method according to claim 8, further comprising entropy encoding said encoded image data, and entropy decoding said entropy encoded image data before said image decoding.

11. The method according to claim 8, wherein the encoding or decoding starts from two or more start point macroblocks within said current slice simultaneously.

12. The method according to claim 8, wherein the predefined growth pattern is used for selecting the next macroblocks for the predicting, and wherein the predefined growth pattern comprises selecting, for a current macroblock, three adjacent macroblocks within said current slice and in different of up, down, left and right direction.

13. An apparatus for encoding image data, comprising:
first prediction means for predicting a plurality of macroblocks belonging to a current slice simultaneously from respective adjacent macroblocks also belonging to the current slice, wherein at least two macroblocks that are adjacent up, down, left or right to a previously encoded macroblock are predicted simultaneously, and wherein the predicting starts from at least one start point macroblock and wherein the prediction direction for any one macroblock is selected according to a predefined growth pattern that comprises prediction in at least one of left and up directions, wherein the growth pattern defines in which spatial direction the prediction spreads and wherein in simultaneously predicting the at least two macroblocks that are adjacent to a previously encoded macroblock different prediction directions are used;

first determining means for determining for at least one macroblock that the encoding cost according to the selected prediction direction is higher than a threshold;

marking means for marking, upon said determining, said at least one macroblock for deferred prediction;

first encoder means for encoding the macroblocks of the image, except said at least one macroblock marked for deferred prediction, comprising residual determining means for determining residual data according to said predicting, and residual encoding means for encoding the residual data, wherein the first encoder skips the at least one macroblock that is marked for deferred prediction;

second determining means for determining that at least one further adjacent macroblock of said at least one marked macroblock was encoded, said at least one further adjacent macroblock belonging to said current slice;

second prediction means for predicting said at least one marked macroblock after at least one further adjacent macroblock of said at least one marked macroblock and belonging to the current slice was encoded; and second encoding means for encoding the marked macroblocks of the image, wherein the resulting encoding data include said mark.

14. The apparatus according to claim 13, further comprising third determining means for determining for a current macroblock that an adjacent macroblock that uses the same prediction direction and belongs to said current slice was marked for deferred prediction; and second marking means for marking the current macroblock for deferred prediction upon said determining, without determining its coding cost.

15. The apparatus according to claim 13, further comprising an entropy coder for entropy encoding said encoded image data.

16. The apparatus according to claim 13, wherein the encoding or decoding starts from two or more start point macroblocks within said current slice simultaneously.

17. The apparatus according to claim 13, wherein the predefined growth pattern is used for selecting the next macroblocks from said current slice for the predicting, and wherein the predefined growth pattern comprises selecting, for a current macroblock, three adjacent macroblocks in up, down, left and right direction.

18. An apparatus for decoding encoded image data, the apparatus comprising:
extraction means for extracting data of at least one start point macroblock, residual data of one or more further macroblocks and, for at least one of the further macroblocks, an indication being a mark for deferred prediction, wherein the at least one start point macroblock and the one or more further macroblocks belong to a same current slice;

first decoder for decoding said macroblocks, wherein the decoding starts from said start point macroblock and proceeds with decoding a plurality of said further macroblocks simultaneously in the order of a predefined growth pattern that includes prediction in at least one of left and up directions, wherein the plurality of said simultaneously decoded further macroblocks are adjacent up, down, left or right to the start point macroblock and belong to said current slice, wherein the growth pattern defines in which spatial direction the prediction spreads, and wherein at least two macroblocks of the plurality of simultaneously decoded further macroblocks are predicted from any particular one previously decoded macroblock using different prediction directions, and wherein the decoder comprises first determining means for determining from said indication that the prediction and reconstruction of said at least one macroblock marked for deferred prediction is to be deferred, prediction means for predicting said further macroblocks from one or more already decoded adjacent macroblocks according to the growth pattern and reconstruction means for adding said residual data, wherein upon a signal from said first determining means the prediction and reconstruction of said at least one macroblock marked for deferred prediction is skipped;

second determining means for determining that, for said at least one macroblock marked for deferred prediction, said first decoder decoded a further adjacent macroblock; and second decoder for decoding, upon said determining, the at least one marked macroblock according to its residual data and the at least two available decoded adjacent macroblocks.

19. The apparatus according to claim 18, further comprising entropy decoder for entropy decoding said entropy encoded image data before said image decoding.

20. The apparatus according to claim 18, wherein the encoding or decoding starts from two or more start point macroblocks within said current slice simultaneously.

21. The apparatus according to claim 18, wherein the predefined growth pattern is used for selecting the next macroblocks for the predicting, and wherein the predefined growth pattern comprises selecting, for a current macroblock, three adjacent macroblocks within said current slice and in different of up, down, left and right directions.

22. An apparatus for encoding image data, comprising:
a first predictor configure to predict a plurality of macroblocks belonging to a current slice simultaneously from respective adjacent macroblocks also belonging to the current slice, wherein at least two macroblocks that are adjacent up, down, left or right to a previously encoded macroblock are predicted simultaneously, and wherein the predicting starts from at least one start point macroblock and wherein the prediction direction for any one macroblock is selected according to a predefined growth pattern that comprises prediction in at least one of left and up directions, wherein the growth pattern defines in which spatial direction the prediction spreads and wherein in simultaneously predicting the at least two macroblocks that are adjacent to a previously encoded macroblock different prediction directions are used;

a first determining unit configured to determine for at least one macroblock that the encoding cost according to the selected prediction direction is higher than a threshold;

a marker device configured to mark, upon said determining, said at least one macroblock for deferred prediction;

a first encoder configured to encode the macroblocks of the image, except said at least one macroblock marked for deferred prediction, comprising a residual determining unit configured to determine residual data according to said predicting, and a residual encoding unit configured to encode the residual data, wherein the first encoder skips the at least one macroblock that is marked for deferred prediction;

a second determining unit configured to determine that at least one further adjacent macroblock of said at least one marked macroblock was encoded, said at least one further adjacent macroblock belonging to said current slice;

a second predictor configured to predict said at least one marked macroblock after at least one further adjacent macroblock of said at least one marked macroblock and belonging to the current slice was encoded; and a second encoder configured to encode the marked macroblocks of the image, wherein the resulting encoding data include said mark.

23. The apparatus according to claim 22, further comprising a third determining unit configured to determine for a current macroblock that an adjacent macroblock that uses the same prediction direction and belongs to said current slice was marked for deferred prediction; and a second marking device configured to mark the current macroblock for deferred prediction upon said determining, without determining its coding cost.

24. The apparatus according to claim 22, further comprising an entropy coder configured to entropy encod said encoded image data.

25. The apparatus according to claim 22, wherein the encoding or decoding starts from two or more start point macroblocks within said current slice simultaneously.

26. The apparatus according to claim 22, wherein the predefined growth pattern is used for selecting the next macroblocks from said current slice for the predicting, and wherein the predefined growth pattern comprises selecting, for a current macroblock, three adjacent macroblocks in up, down, left and right direction.

27. An apparatus for decoding encoded image data, the apparatus comprising:
   an extractor configured to extract data of at least one start point macroblock, residual data of one or more further macroblocks and, for at least one of the further macroblocks, an indication being a mark for deferred prediction, wherein the at least one start point macroblock and the one or more further macroblocks belong to a same current slice;
   a first decoder configured to decode said macroblocks, wherein the decoding starts from said start point macroblock and proceeds with decoding a plurality of said further macroblocks simultaneously in the order of a predefined growth pattern that includes prediction in at least one of left and up directions, wherein the plurality of said simultaneously decoded further macroblocks are adjacent up, down, left or right to the start point macroblock and belong to said current slice, wherein the growth pattern defines in which spatial direction the prediction spreads, and wherein at least two macroblocks of the plurality of simultaneously decoded further macroblocks are predicted from any particular one previously decoded macroblock using different prediction directions, and wherein the decoder comprises
   a first determining unit configured to determine from said indication that the prediction and reconstruction of said at least one macroblock marked for deferred prediction is to be deferred,
   a predictor device configured to predict said further macroblocks from one or more already decoded adjacent macroblocks according to the growth pattern and a reconstruction device configured to add said residual data, wherein upon a signal from said first determining unit, the prediction and reconstruction of said at least one macroblock marked for deferred prediction is skipped;
   a second determining unit configured to determine that, for said at least one macroblock marked for deferred prediction, said first decoder decoded a further adjacent macroblock; and
   a second decoder configured to decode, upon said determining, the at least one marked macroblock according to its residual data and the at least two available decoded adjacent macroblocks.

28. The apparatus according to claim 27, further comprising an entropy decoder configured to entropy decode said entropy encoded image data before said image decoding.

29. The apparatus according to claim 27, wherein the encoding or decoding starts from two or more start point macroblocks within said current slice simultaneously.

30. The apparatus according to claim 27, wherein the predefined growth pattern is used for selecting the next macroblocks for the predicting, and wherein the predefined growth pattern comprises selecting, for a current macroblock, three adjacent macroblocks within said current slice and in different of up, down, left and right directions.

* * * * *